358-242. XR 2,940,004 SR CROSS REFERENCE SEARCH RO
June 7, 1960 H. E. BONNER 2,940,004
APPARATUS FOR QUICK BEAM EXTINCTION IN TELEVISION RECEIVERS
Filed July 1, 1957
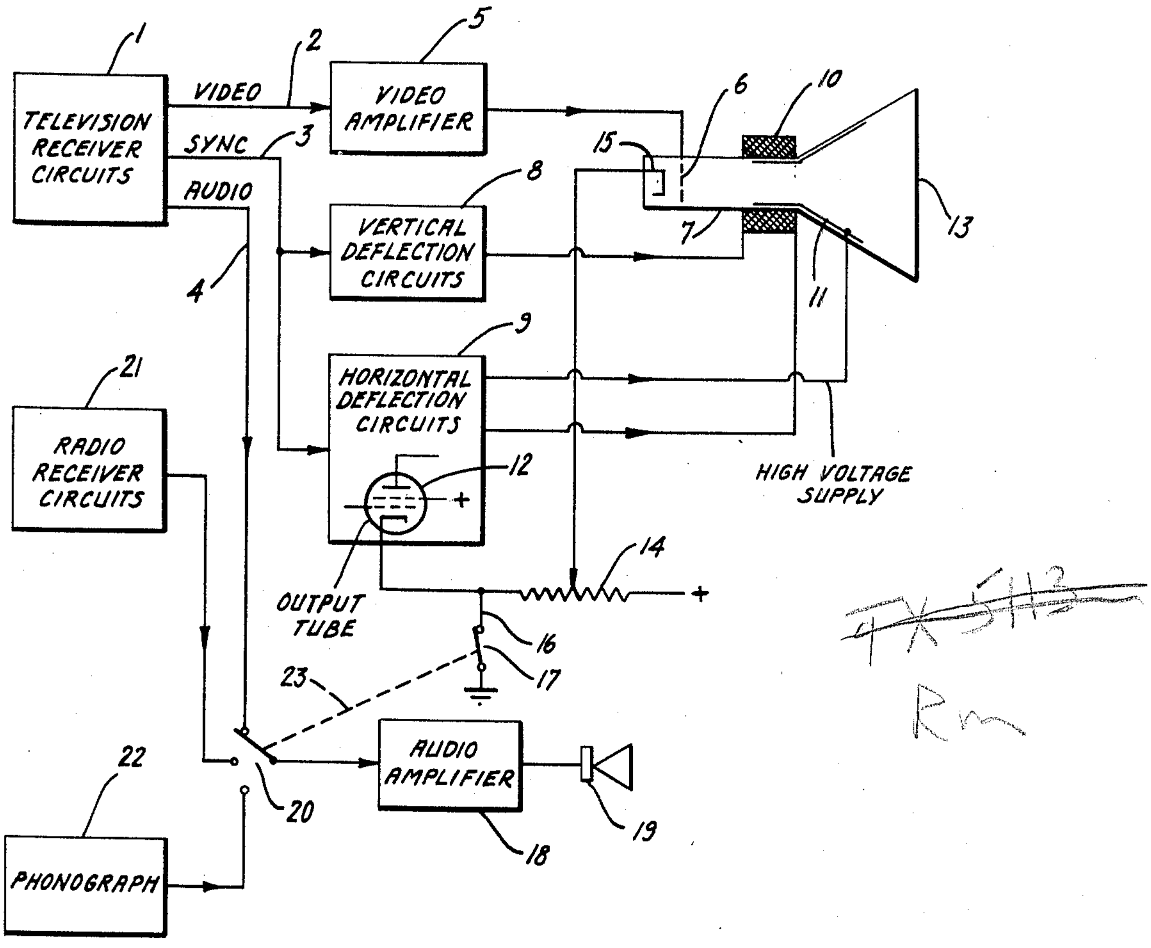
INVENTOR.
HOWARD E. BONNER
BY Fordyce A. Bothwell
ATTORNEY United States Patent Office 2,940,004

Patented June 7, 1960

2,940,004

APPARATUS FOR QUICK BEAM EXTINCTION IN TELEVISION RECEIVERS

Howard E. Bonner, Meadowbrook, Pa., assignor to Philco Corporation, Philadelphia, Pa., a corporation of Pennsylvania Filed July 1, 1957, Ser. No. 669,267

6 Claims. (Cl. 315—20)

This invention relates to arrangements for quickly extinguishing the electron beam in the image-reproducing tube of a television receiver.

It is well known that the beam in such a tube persists after the deflection circuits have been disabled, as evidenced by the bright spot on the screen. This is due to the fact that the high voltage on the anode of the tube persists due to the high anode-to-ground capacity. The residual bright spot is undesirable as it tends to deteriorate a small area of the screen.

In the case of a television receiver as a single instrument, this condition occurs whenever the receiver is turned off. In the case of a combination including also a radio receiver and/or a phonograph, this condition also occurs whenever the selector switch is actuated to switch from television to another instrument.

As regards turn-off of a television receiver, the electron beam in the cathode ray tube may be quickly extinguished by an arrangement such as that disclosed in U.S. Patent No. 2,280,670 issued April 21, 1942 to S. C. Spielman. In that arrangement a voltage is built up across a condenser and is used as a beam-extinguishing bias when the receiver is turned off.

In the case of a combination including a television receiver, it is desirable in the interest of economy to employ a common power supply for the combined instruments. Since the high voltage for the anode of the cathode ray tube is commonly derived from the horizontal deflection circuits, in switching from television to radio or phonograph the cathode ray beam may be extinguished by disabling the horizontal deflection circuits. However, the beam extinction is slow due to persistence of the high voltage caused by the high anode-to-ground capacity.

The principal object of the present invention is to overcome this objection by a simple arrangement which does not require any additional elements and which effects rapid beam extinction by utilizing a potential that is present in the television receiver.

As is well known, in a conventional television receiver the horizontal deflection system includes a horizontal output tube, usually a tetrode or pentode, whose cathode circuit may be opened to terminate the beam deflection. The receiver also includes a brightness control potentiometer whose movable contact is connected to the cathode of the cathode ray tube.

In accordance with a preferred embodiment of the present invention, a common ground connection is provided for the cathode of the horizontal output tube and the brightness control potentiometer, and a single switch is provided in the common ground connection. With this arrangement, opening of the switch causes immediate rise of the bias on the cathode of the cathode ray tube substantially to the screen potential of the horizontal output tube, and thus the beam of the cahode ray tube is quickly extinguished.

The invention may be fully understood from the following detailed description with reference to the accompanying drawing wherein the single figure is a diagrammatic illustration of a combination including a television receiver embodying a preferred arrangement according to the present invention.

Referring more particularly to the drawing, block 1 represents the conventional circuits of a television receiver from which are derived the video signal at 2, the synchronizing signals at 3, and the audio signal at 4. The video signal is supplied through video amplifier 5 to the control electrode 6 of the cathode ray tube 7. The synchronizing signals are supplied to the vertical and horizontal deflection circuits 8 and 9, which supply deflection currents to the yoke 10. The necessary high voltage for the anode 11 of the cathode ray tube is derived from the horizontal deflection circuits in a manner well understood by those skilled in the art. The horizontal deflection circuits include a horizontal output tube shown at 12, whose screen electrode is maintained at a relatively high positive potential, e.g. 180 volts. The electron beam within the cathode ray tube 7 may be extinguished by disabling the horizontal deflection circuits in any suitable manner, as by opening the grounded cathode circuit of tube 12. This interrupts the supply of high voltage to the anode 11 but the latter remains at high voltage for an appreciable time due to its high capacity to ground, and therefore normally the beam persists.

The brightness of the picture produced on the viewing screen 13 of the cathode ray tube 7 is controlled by means of a brightness control potentiometer 14, one end of which is maintained at a positive potential. Normally the other end of potentiometer 14 is connected directly to ground. The movable contact of potentiometer 14 is connected to the cathode 15 of the cathode ray tube 7. As thus far described, the television receiver is conventional.

In accordance with the present invention, the cathode of tube 12 and the left hand end of potentiometer 14 are interconnected, and are connected to ground through a common connection 16 in which there is provided a single-pole single-throw switch 17. When this switch is closed, the television receiver operates in the usual manner. When the switch is opened, the supply of high voltage to anode 11 is interrupted, and at the same time the cathode of tube 12 rises in potential substantially to the screen potential. Since the potentiometer 14 is connected directly to the cathode of tube 12, the bias on the cathode of the cathode ray tube 7 is immediately raised substantially to the screen potential of tube 12, and the electron beam within the cathode ray tube 7 is quickly extinguished.

In this arrangement, it will be seen that the switch 17 is common to two circuits. One of these is the circuit for supplying a bias voltage to the cathode of the cathode ray tube 7. The other is the cathode circuit of tube 12. Normally these circuits are connected to ground and they perform their normal functions. But when switch 17 is opened, both of these circuits are opened and their interconnected portions then serve as a connection by which the screen potential of tube 12 is effectively applied to the cathode of the cathode ray tube 7 to extinguish the beam therein.

In a combination, such as the television-radio-phonograph combination shown, not only is there a common power supply (not shown), but there is also a common audio amplifying and sound-reproducing system, as represented by audio amplifier 18 and sound reproducer 19. A selector switch 20 is provided for selective switching of the television receiver circuits 1, the radio receiver circuits 21, and the phonograph 22. It will be understood that block 21 represents the conventional radio receiver circuits from which an audio signal is derived, and block 22 represents a conventional phonograph which also supplies an audio signal.

In such a combination, the switch 17 may be ganged with the selector switch 20, as indicated by the broken line 23. Then whenever switch 20 is actuated from the position shown to switch from television to radio or phonograph, switch 17 is automatically opened and the electron beam within the cathode ray tube 7 is immediately extinguished as hereinbefore described.

From the foregoing description, it will be seen that the present invention provides an extremely simple arrangement by which immediate extinction of the cathode ray beam is effected by utilizing an existing potential for this purpose. While a preferred embodiment of the invention has been illustrated and described, it is to be understood that the invention is not to be limited thereto but contemplates such modifications and other embodiments as may occur to those skilled in the art.

I claim:

1. In a television receiver, an image-producing tube having a cathode, a brightness control potentiometer having one end at positive potential and having its movable contact connected to said cathode, means for effecting beam deflection in said tube, said means including a horizontal output tube having a cathode and also having a screen grid at predetermined positive potential, and means including a single switch for connecting the other end of said potentiometer and the cathode of said horizontal output tube to a point at relatively low potential, whereby opening of said switch causes rise of the bias on the cathode of said image-reproducing tube substantially to said screen grid potential and thus extinguishes the beam of the image-reproducing tube.

2. In a television receiver, an image-reproducing tube having a cathode and an anode, means for effecting horizontal beam deflection in said tube and for supplying a high voltage to said anode, said means including a horizontal output tube having a cathode and also having a screen grid at predetermined positive potential, a switch having a pair of terminals, a connection between said first-mentioned cathode and one of said terminals, a connection between said second-mentioned cathode and the same terminal of said switch, and means connecting the other terminal of said switch to a point of relatively low reference potential, whereby opening of said switch causes rise of potential of the first-mentioned cathode substantially to said screen grid potential and thus extinguishes the beam which tends to persist due to persistence of high voltage on said anode.

3. A television receiver according to claim 2, wherein the first-recited connection includes means for supplying a bias voltage to the first-mentioned cathode.

4. In a television receiver, an image-reproducing tube having a cathode, means for effecting beam deflection in said tube, said means including a tube having a cathode and an electrode at predetermined positive potential, a switch having a pair of terminals, a connection between said first-mentioned cathode and one of said terminals, a connection between said second-mentioned cathode and the same terminal of said switch, and means connecting the other terminal of said switch to a point of relatively low reference potential, whereby opening of said switch causes rise of potential of the first-mentioned cathode substantially to said positive potential and thus extinguishes the beam of said image-reproducing tube.

5. A television receiver according to claim 4, wherein the first-recited connection includes means for supplying a bias voltage to the first-mentioned cathode.

6. In a television receiver, an image-reproducing tube having a cathode, means for effecting beam deflection in said tube, said means including a tube having a cathode and an electrode at predetermined positive potential, and means including a single switch for connecting both of said cathodes to a point of relatively low potential, whereby opening of said switch causes rise of potential of the first-mentioned cathode substantially to said positive potential and thus extinguishes the beam of said image-reproducing tube.

References Cited in the file of this patent

UNITED STATES PATENTS

| | | |
|---|---|---|
| 2,280,670 | Spielman | Apr. 21, 1942 |
| 2,752,525 | Montague | June 26, 1956 |
| 2,810,858 | Stein | Oct. 22, 1957 |

FOREIGN PATENTS

| | | |
|---|---|---|
| 524,244 | Belgium | Mar. 2, 1956 |
| 203,283 | Australia | June 16, 1955 |

OTHER REFERENCES

Rider's Television Manual, vol. 4, R.C.A. T.V., pages 4–85 and 4–87, published May 10, 1950.